Patented Mar. 8, 1949

2,463,940

UNITED STATES PATENT OFFICE 2,463,940

N-(2-PHENYLACETOXYETHYL)-PHENYL-ACETAMIDE

Otto K. Behrens and Reuben G. Jones, Indianapolis, Ind., and Joseph W. Corse, Lafayette, Calif., assignors to Eli Lilly and Company, Indianapolis, Ind., a corporation of Indiana No Drawing. Original application August 24, 1945, Serial No. 612,536. Divided and this application December 11, 1948, Serial No. 64,906

1 Claim. (Cl. 260—477)

This is a division of application Serial No. 612,536, filed August 24, 1945.

This invention relates to a new N-phenyl-acetylated amino alcohol derivative.

By this invention there is provided N-(2-phenylacetoxyethyl) - phenylacetamide which may be represented by the formula

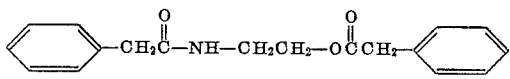

The composition of the present invention may be prepared by a process of phenylacetylation. Thus, for example, the phenylacetyl ester of ethanolamine may be heated with phenylacetic acid or with an ester of phenylacetic acid, such as ethyl phenylacetate, to produce N-(2-phenyl-acetoxyethyl) - phenylacetamide. Alternatively, the phenylacetyl ester of ethanolamine may be reacted with a phenylacetyl halide, for example phenylacetyl chloride, to produce the desired phenylacetyl compound.

As described and claimed in copending application Serial No. 612,538, now Patent No. 2,440,359, the compound of this invention has been found to exhibit novel and unexpected utility in the preparation of penicillin. By way of contrast, this utility is not possessed by phenylacetylated alkanolamines in general. It is known of course that penicillin may be produced, presumably as a metabolic product, when a Penicillium mold is grown in the presence of a nutrient medium, and the penicillin so produced subsequently may be isolated from the mold and nutrient medium.

As described and claimed in said Patent No. 2,440,359, an accelerated rate of production and increased yield of penicillin may be obtained by incorporating a relatively small amount of one or more of the compounds of the present invention in the culture medium of a nutrient material in which the Penicillium mold is grown.

This invention is further illustrated by the following specific example:

N-(2 - phenylacetoxyethyl) - phenylacetamide represented by the formula

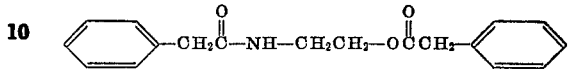

may be prepared as follows:

6.1 g. of ethanolamine and 29.9 g. of phenyl-acetic acid are heated at about 160–180° C. for about five hours. The molten reaction product is then cooled and extracted with potassium bicarbonate solution. The insoluble residue consisting of N-(2-phenylacetoxyethyl)-phenylacet-amide is purified by precipitating it from alcohol solution by the addition of several volumes of water. The purified product melts at about 85° C. and analysis has shown the presence of 4.6 percent nitrogen as compared with a calculated value of 4.72 percent.

We claim:

N-(2 - phenylacetoxyethyl) - phenylacetamide represented by the formula

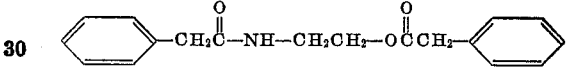

OTTO K. BEHRENS.
REUBEN G. JONES.
JOSEPH W. CORSE.

No references cited.